United States Patent [19]
Endres et al.

[11] 3,900,031
[45] Aug. 19, 1975

[54] DISPOSABLE DIAPER WITH REINFORCED WAISTBAND AND TAPE ATTACHMENT MEANS

[75] Inventors: Dan D. Endres, Appleton; Esther M. Lafond, Winnebago, both of Wis.

[73] Assignee: Kimberly-Clark Corporation, Neenah, Wis.

[22] Filed: Aug. 22, 1974.

[21] Appl. No.: 499,437

[52] U.S. Cl.............. 128/287; 128/284; 128/290 R
[51] Int. Cl.² .................. A41B 13/02; A61F 13/16
[58] Field of Search................ 128/284, 287, 290 R

[56] References Cited
UNITED STATES PATENTS

| | | | |
|---|---|---|---|
| 3,520,303 | 7/1970 | Endres | 128/287 |
| 3,776,232 | 12/1973 | Schaar | 128/287 |
| 3,783,871 | 1/1974 | Sabee | 128/287 |
| 3,794,038 | 2/1974 | Buell | 128/287 |
| 3,814,100 | 6/1974 | Nystrand | 128/287 |

*Primary Examiner*—Aldrich F. Medbery
*Attorney, Agent, or Firm*—Daniel J. Hanlon, Jr.; William D. Herrick; Raymond J. Miller

[57] ABSTRACT

A reinforced waistband and tape attachment means for disposable diapers particularly applicable to diapers comprised of an absorbent filler disposed between a fluid permeable cover sheet and a thermoplastic plastic film backing and having a thin thermoplastic film strip internally placed in the waistband area at each end. In this invention, the absorbent filler component of the diaper does not extend completely into the waistband area. This permits the facing sheet, backing sheet and supplemental plastic strip to be heat-sealed together at the diaper edge adjacent the end of the filler to provide a reinforced area at the edges of the waistband where the pressure-sensitive fastening tape is attached, as well as to provide a thinner, more flexible and better fitting waistband.

2 Claims, 9 Drawing Figures

DISPOSABLE DIAPER WITH REINFORCED WAISTBAND AND TAPE ATTACHMENT MEANS

BACKGROUND OF THE INVENTION

Most disposable diapers as now manufactured and sold comprise an absorbent filler disposed between a non-woven, fluid-permeable, body-facing top sheet and a fluid-impermeable plastic film backing sheet. At one end of the diaper adjacent the portion of the diaper which forms the waistband there is now commonly provided a pair of pressure-sensitive tapes which are used in place of pins for fastening the diaper at the waist. One end of the tape is adhered directly to the plastic film backing and the other end extends beyond the diaper edge where the pressure-sensitive surface is temporarily covered by a protective sheet. In applying the diaper, the tape is stripped from the protective sheet and is then pulled as tightly as possible around the waist of the child and attached to the backing sheet at the opposite waistband to fasten the ends of the diaper together. Even when this operation is done with care the plastic film backing sheet is often distorted or stretched to an extent that it becomes weakened and tears easily or results in a baggy fit. When the plastic backing is stressed sufficiently to tear during diaper application, it will render that particular diaper useless. While general reinforced areas have been suggested to prevent this defect, most of the suggested reinforcements require complicated structures and/or increased cost.

This invention relates to an improved structure which reinforces the diaper in the area of tape attachment, while at the same time providing a closer, more flexible fit at the waist, and which does not involve increased costs.

SUMMARY OF THE INVENTION

The improvement in disposable diapers defined in this invention relates particularly to a diaper structure comprised of a rectangular absorbent pad filler having a fluid pervious cover sheet, a plastic film backing sheet, and a thin strip of flexible plastic film interposed between the cover sheet and the backing sheet in the waistband area at each end of the diaper. In the prior art structure, one edge area of this film strip is heat-sealed to the cover sheet and to the backing sheet along the entire end to close the diaper ends while the other edge of the film strip extends into the interior of diaper where it is disposed over the respective end of absorbent pad filler to act as a leakage reducing dam. In the diaper of this invention at least one end of the pad filler is shortened so that it does not extend all the way to the sealed end margins of the diaper. The filler is cut back in length so that it ends about 1 inch to 1 ½ inches short of the sealed diaper end. A narrow waistband section at that end of the diaper is therefore free of absorbent filler. In this filler free section, there is provided a laminated area at each edge of the diaper immediately adjacent the shortened ends of the absorbent pad filler by heat-sealing together in that area the cover sheet, the thermoplastic film strip and the thermoplastic film backing sheet. The reinforced area preferably is about three-eighth to five-eighth inches wide and extends inwardly from the diaper edge about 1 to 2 inches. The pressure-sensitive fastening tapes are adhered to the back side of the diaper at each of these reinforced areas with a free end of each tape extending beyond the diaper edge in the usual manner. It has been found that this small heat-sealed area so reinforces the structure that when a pulling force is exerted on the free ends of these tapes when fastening the diaper, the resulting stress is divided between all three elements of the lamina which now make up the waistband area in the filler free section and much more stress can be applied to the tapes without stretching or tearing the plastic backing than was previously possible when only the plastic film backing served as the anchoring element for the tape. Since more force can be applied on the tapes when closing the diaper; since a major portion of the cover sheet, film strip, and backing sheet between the reinforced edges remain unattached; and since there is no filler material in the waistband area, a tighter fit is possible which fit is less susceptible to loosening or sagging during use. In addition, since less filler is needed total material costs are reduced. A similar filler free reinforced area can also be provided at the other end of the diaper to give the entire waistband the above advantages when it is fastened on the child.

The above features and advantages of the invention as well as others will become apparent from the following detailed description and accompanying drawings.

DESCRIPTION OF THE PREFERRED EMBODIMENTS

Figure 1:
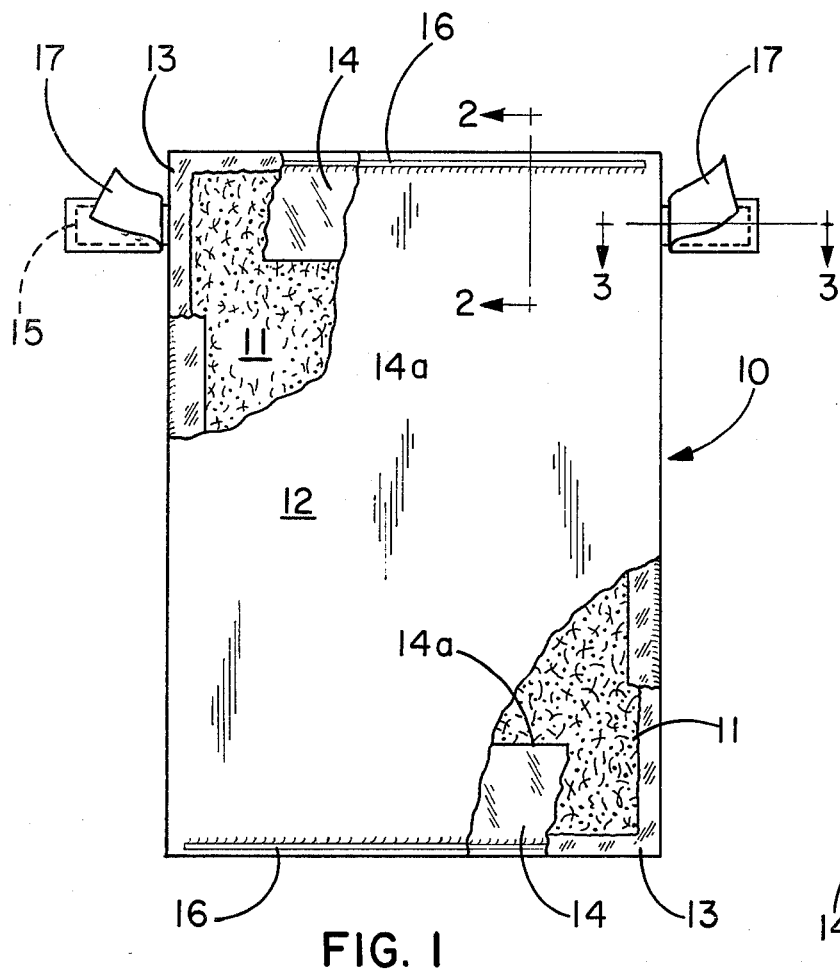
FIG. 1 is a plan view with portions partially cut away showing a prior art diaper to which the invention particularly applies.
Figure 2:
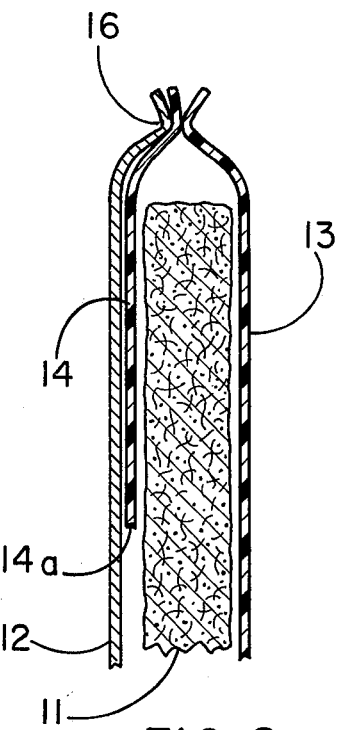
FIG. 2 is a section taken along line 2—2 of FIG. 1.
Figure 3:
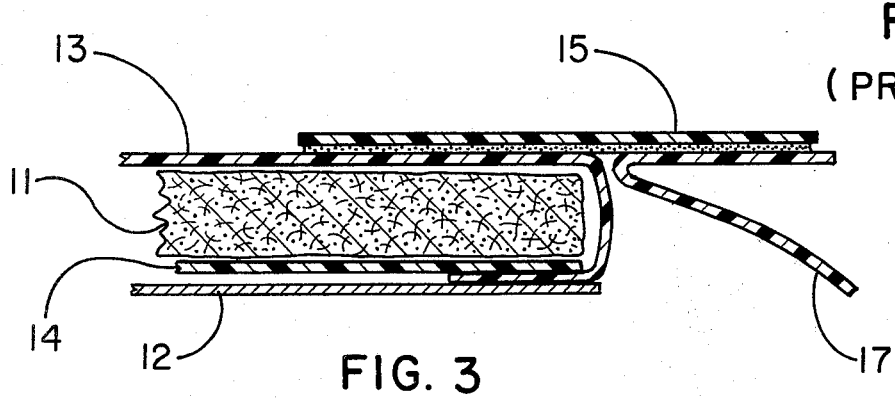
FIG. 3 is a section taken along line 3—3 of FIG. 1.

FIGS. 1–4 of the drawings illustrate a prior art diaper structure to which this invention is particularly applicable. A detailed description of this diaper may also be found in Endres U.S. Pat. No. 3,502,303 of July 14, 1970.

In these prior art figures, diaper 10 comprises an absorbent filler 11, a fluid-pervious cover 12, a fluid impervious backing sheet 13 of thermoplastic film, and a thin, flexible strip 14 of thermoplastic film.

Plastic strip 14 is interposed between cover sheet 12 and backing sheet 13 at both the top and bottom ends of the diaper. These three elements are heat-sealed together along line 16 at each end. The opposite end 14a of strip 14 extends inwardly a short distance over filler 11 and is disposed immediately under cover sheet 12. A pair of pressure-sensitive fastening tapes 15 covered by removable protective sheet 17 is also provided at one end in the waistband area.

Fluids which strike cover sheet 12 are absorbed in filler 11 and spread in all directions within the filler by gravity and by capillary action. When the fluid flows to the ends of the diaper it is trapped in the pockets formed at each end by strip 14. Accordingly there can be substantially no overflow or leakage at these ends until the central filler is substantially saturated.

In addition to functioning as a leak-proofing element, strips 14 contribute to making the transverse heatseal at each end stronger by providing more thermoplastic material at the seal.

While this diaper structure is an improvement over structures which do not have strips 14, when fastening tapes are used in applying this diaper, or any other plastic backed diaper to a child there is a need for a structure which enables maximum pulling force to be applied to the fastening tape during such application without causing other elements of the diaper structure to fail or to be overstressed.

Figure 4:
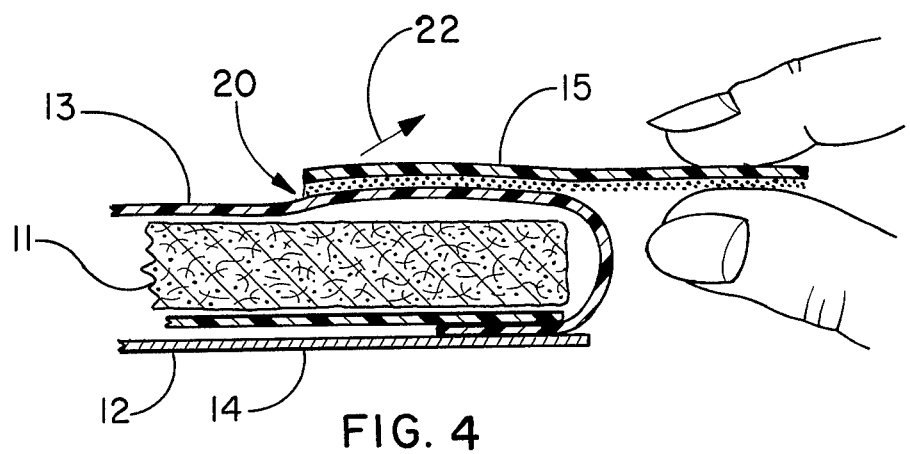
FIG. 4 is a sectional view similar to FIG. 3 illustrating the pulling effect of the attachment tape on the backing sheet during application of the prior art diaper.

The effect of pulling force applied to the fastening tape in the above-described prior art structure is illustrated in FIG. 4. As shown there, when a pulling force is applied to tape 15 during application of the diaper to get a snug fit at the waistband, all of the pulling force is exerted on backing film 13. This causes the film to stretch at area 20 and to pull away from the filler in the direction shown by arrow 22. If excessive force is exerted, film 13 may even tear at 20 and the diaper will become useless and must be discarded. In any event, in this prior art construction all the pulling force is exerted on backing film 13 and none on other components of the diaper. Merely heat-sealing plastic backing film 13 to filler 11 in the area where tape 15 is attached in an attempt to provide added strength does not alleviate the problem. The usual absorbent material used for filler 11 has so little structural integrity that even if it is heat-sealed to the backing it is still easily pulled apart so that the resultant force still operates in the direction of arrow 22. Further, heat-sealing the plastic backing film to a fibrous substrate tends to thin out film 13 in the entire heat-sealed area and at the periphery thereof so that the backing film is therefore actually weaker in that area where strength is most needed. Such an approach does not solve the problem.

Figure 8:
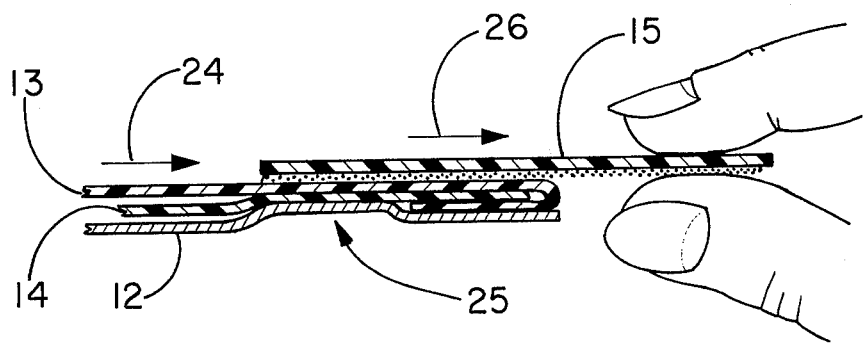
FIG. 8 is a sectional view similar to FIG. 7 illustrating the pulling effect of the attachment tape on the diaper elements during application of the diaper of this invention.
Figure 5:
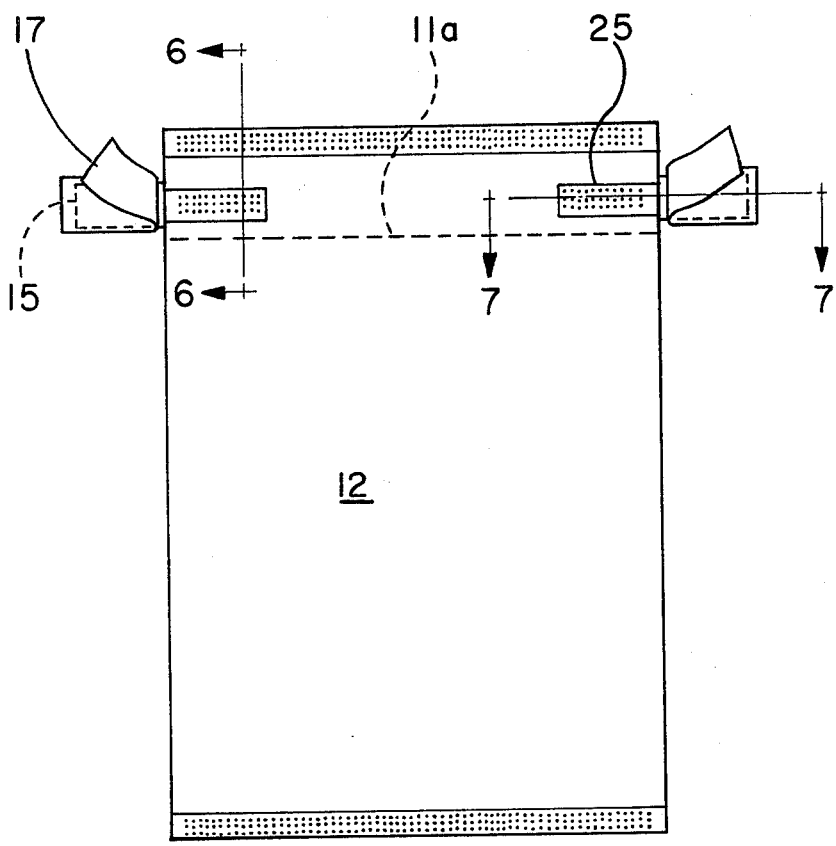
FIG. 5 is a plan view of the improved diaper structure of this invention.
Figure 6:
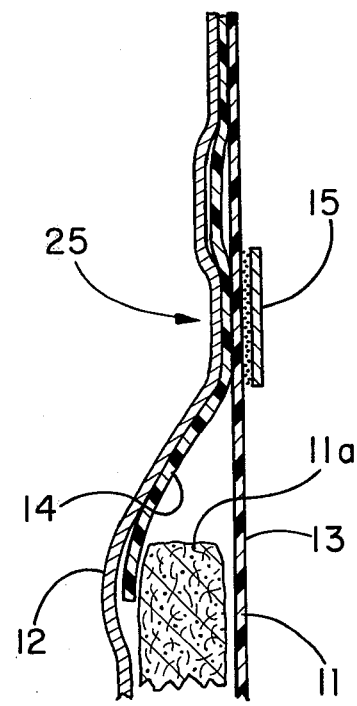
FIG. 6 is a section taken along line 6—6 of FIG. 5.
Figure 7:
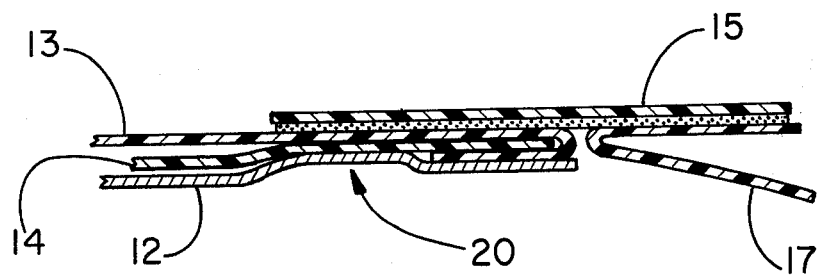
FIG. 7 is a section taken along line 7—7 of FIG. 5.

However, if the absorbent filler is shortened at one end of the diaper, as shown at 11a in FIGS. 5 and 6 so that it still extends under the edge of strip 14 but does not reach the diaper end, and if then the three elements remaining in that area, i.e., cover sheet 12, plastic strip 14 and plastic backing sheet 13 are heat-sealed together in a small area at each edge of the diaper where the fastening tape is secured, several improvements result. First of all, because plastic strip 14 adds more thermoplastic material to the heat-sealed area, even though the strip itself may be slightly weakened, there is actually an increase in strength since now the two film elements in the heat-sealed area are unified into an effectively thicker film. Second, the cover sheet 12, film strip 14, and backing film 13 all share the stress applied to the diaper when the tape is pulled to fasten the diaper at the waist. The pulling forces applied during diaper attachment prevent backing film 13 from bellying out as shown in the FIG. 4 prior art, but permit the unified area 25 and areas extending therebetween to be drawn in the direction of arrows 24 and 26 as shown in FIG. 8. Third, because cover sheet 12, film strip 13 and backing film 14 are unattached where they span the diaper between heat-sealed areas 25 they can each move independently over this unattached span and thereby adjust to a balanced uniformly tensioned condition to provide improved flexibility and a snug waistband fit during the whole period the diaper is worn. Stated another way, in the event that the three sheet elements which span the distance between heat-sealed areas are of slightly unequal length the shorter elements will stretch first until all elements are of equal length and the stress will then be equally distributed in the waistband area. The type of heat-seal is not critical, but an overall seal with a pattern of spaced embossments as shown in the drawings has been found especially effective.

Diapers having a 1 mil backing film, a 0.8 mil film strip, and a 23 gram per square yard non-woven cover were made in accordance with the prior art structure described above and shown in FIGS. 1–4 and compared to diapers constructed in accordance with this invention as shown in FIGS. 5–8 wherein the filler was shortened and heat-sealed areas 25 were provided at the diaper edges adjacent the shortened filler. In the latter test diapers, these sealed areas measured about 1 ¾ inches by ⅜ inch.

In bench tests of the prior art diaper, it was found that on the average the tapes tore the backing and could be pulled off from the diaper when about 2700 grams of force were exerted. With the reinforced structure of this invention, failure of diaper elements occurred on the average only after about 4000 grams of force were exerted. When the film strip thickness was increased to 2 mils, the average failure value of the reinforced structure increased to about 5,400 grams while a similar change in film strip thickness did not improve the failure record of the prior art diaper.

When the same two structures with the 0.8 mil strips were tested in actual use, substantially no taping failures occurred with the reinforced structure while several failures were reported with the prior art structure.

Figure 9:
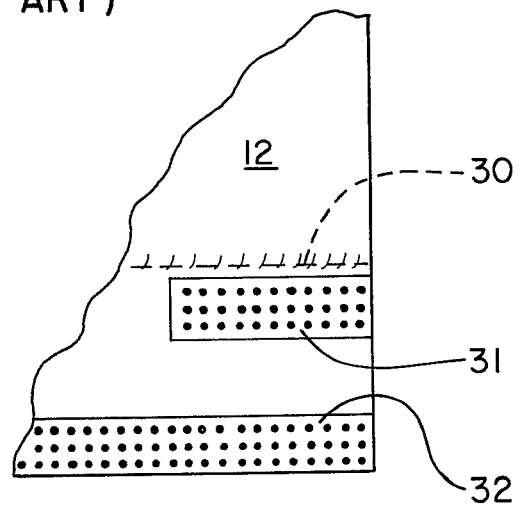
FIG. 9 is a partial plan view of one lower corner of a modified version of the diaper of FIG. 5.

In a further modified embodiment of the invention, the opposite end of the filler section was also shortened and reinforced laminated areas provided at the edges of this opposite end of the diaper in the filler free areas. This modified structure is shown in FIG. 9, where 30 indicates the shortened lower end of the filler, 31 indicates the laminated reinforced area, and 32 indicates the the sealed diaper end. When the diaper is taped in place on the child the free end of the tape is attached at these reinforced areas. With this latter structure the entire wasitband area is thinned and because it provides more flexibility a still better fit is obtained than when only the tape end of the diaper is modified as herein described.

What is claimed is:

1. An improvement in a disposable diaper in which the sealed side edges of the diaper provide leg-encircling means and the sealed ends of the diaper provide a body-encircling waistband, said diaper being of the type which comprises an absorbent filler sandwiched between a fluid-permeable cover and a thermoplastic film backing and which also has a narrow thermoplastic film strip internally disposed between said cover and said backing at the ends and which film strip is heat-sealed to said cover and said backing across said ends forming the waistband, said improvement comprising a structure in which one end of said filler is short of one heat-sealed end leaving a narrow filler free section at that end, said filler free section having a small laminated area at the edges of the diaper adjacent the short filler end, said laminated area being formed by heat-sealing the cover sheet, backing sheet and film strip together in that area, said laminated area extending inward from the diaper edges about 1 to 2 inches and being about three-eighth to five-eighth inch wide, said diaper being provided with pressure-sensitive adhesive tape strips with one end of a strip of said pressure-sensitive adhesive tape being affixed to said backing in each of said laminated areas and the other end of said strip extending beyond the respective diaper edge.

2. The diaper of claim 1 wherein the opposite end of said filler is also shortened and the filler free end provided at this opposite end of the diaper also has a small laminated heat-sealed area comprised of the cover sheet, backing film, and film strip disposed at each of the diaper edges adjacent the shortened filler at said opposite end.

* * * * *